F. A. STEVENS.
LENS MOUNTING.
APPLICATION FILED JULY 1, 1914.

1,117,273.

Patented Nov. 17, 1914.

Witnesses
Albert G. Pucynkowski
Fredd P. Gadison

Inventor
Frederick A. Stevens
By Xanatis E. Bellows
Attorney.

UNITED STATES PATENT OFFICE.

FREDERICK A. STEVENS, OF PROVIDENCE, RHODE ISLAND, ASSIGNOR TO STEVENS AND COMPANY, INCORPORATED, A CORPORATION OF RHODE ISLAND.

LENS-MOUNTING.

1,117,273.   Specification of Letters Patent.   Patented Nov. 17, 1914.

Application filed July 1, 1914. Serial No. 848,385.

*To all whom it may concern:*

Be it known that I, FREDERICK A. STEVENS, a citizen of the United States, residing at Providence, in the county of Providence and State of Rhode Island, have invented certain new and useful Improvements in Lens-Mountings, of which the following is a specification.

My invention relates to lens mountings, and more particularly to members connecting a spectacle or eyeglass lens either to the temple end piece, or to the stud which carries the spring, bridge, or guard.

These mountings are at present connected to the lenses either by screws, which require perforations through the lenses for their reception, thus weakening or breaking the latter, or the smooth bearing surfaces of the mountings are separated from the lenses by a layer or coat of cement, which is inadequate to sustain the prying strain brought to bear when the parts are handled, particularly in certain temperatures and under certain atmospheric conditions. That is to say, if the air is hot, the cement becomes soft or elastic; if cold, it becomes brittle, thus permitting relative movement between the lens and mounting. This effect is enhanced by the difference in degrees of contraction between metal and cement. Another trouble is that when initially pressing the mounting against the lens with a mass of cement therebetween, the latter exudes, leaving an insufficient amount for adhesive purposes.

The essential objects of my invention are to overcome the enumerated disadvantages, and to insure a perfect, permanent, and effective adherence of the mounting to the lens.

To these ends my invention consists in such parts and combinations of parts as fall within the scope of the appended claims.

Figure 1:
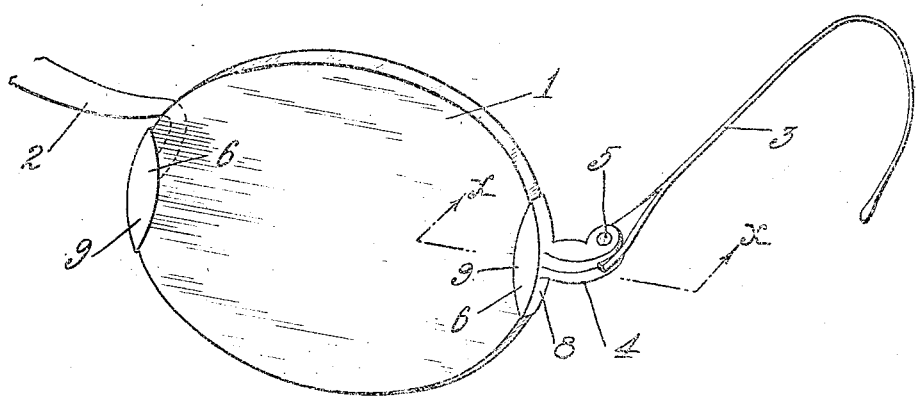
Figure 2:
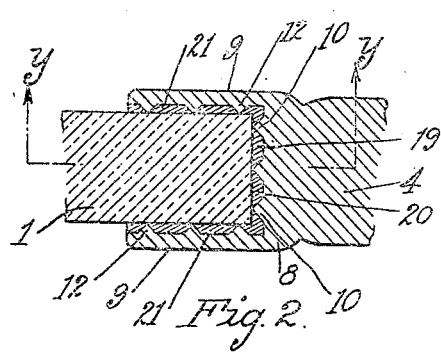
Figure 3:
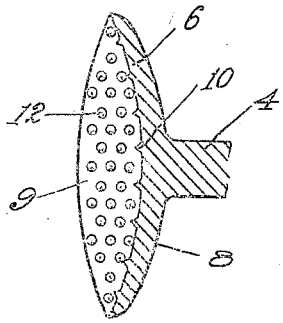
Figure 4:
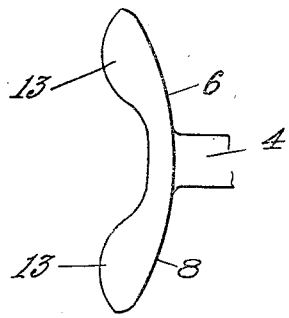
Figure 5:
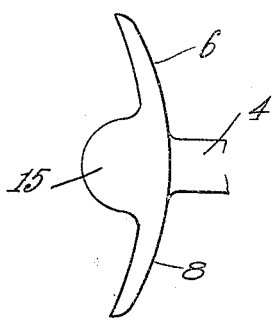
Figure 6:
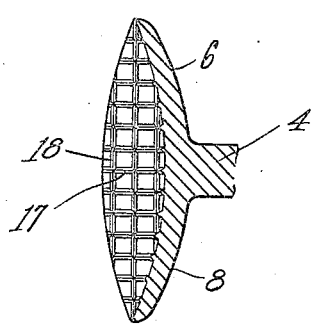

In the accompanying drawings which form a part of this specification, Figure 1, is a perspective view of a lens and its adjacent parts provided with my novel mountings, Fig. 2, a section of the same on line $x$, $x$, of Fig. 1, Fig. 3, a section on line $y$, $y$, of Fig. 2, with the cement layer omitted, Figs. 4 and 5, side elevations in modified forms of my mounting, and Fig. 6, a section corresponding to $y$, $y$, another modified form of my invention, a cement layer being omitted.

Like reference characters indicate like parts throughout the views.

1 represents an ordinary lens, 2 the portion of an ordinary spectacle bridge adjacent the frame, 3 a temple, 4 an end piece, and 5 the pivot pin for the temple, all of the usual construction. Integral with the inner portion of the end piece 4 is a cup-shaped shell 6, comprising a curved base 8, and parallel side walls 9. Upon the inner surfaces of the base 8 are interspaced conical projections 10, and upon the inner surfaces of the ears or walls 9 are similar projections 12.

The walls 9 of the cap or cup 6 have their edges arcuate or swelled throughout their extent, but as shown in Fig. 4 the walls 13 may amount to little more than curved end lugs; or as shown in Fig. 5, the walls 15 may consist merely of lugs centrally located relatively to the base 8.

The described form of projections 12 are found especially effective, but practical results may be attained by constituting for the conical projections 10 and 12 respectively V-shaped ribs 17 and 18 intersecting each other as shown in Fig. 6.

The described cup 6 is applied to the margin of the lens with the projections 10 in contact with the edge of the lens, and the projections 12 in contact with the faces of the lens, with a layer 19 of cement between the edge of the lens and the base 8, located in the spaces 20 between the teeth 10. Similar layers 21 of cement are located between the faces of the lens and the walls 9 of the mounting, in the spaces between the projections 12.

The only portions of the mounting in contact with the lens surfaces are the projections 10 and 12. These afford a minimum of metallic contacting area, while affording as strong and effective a bearing for the lens as would be the case if the bearing surface were continuous, and insure security against any excessive or sudden strains. Adhesion is increased by the cement layers which are of uniform depth throughout, since the projections insure against uneven pressure of any part of the mounting when the latter is initially pressed in contact with the lens. The projections also furnish an increased area of metal in contact with the cement which increases adhesion. After the cement has hardened its non-continuous character resultant upon the presence of the projections makes it less liable to crack in a cold temperature; and the strain resisting character of the prongs makes any softening of the cement by heat less important.

What I claim is,—

1. In eyeglasses or spectacles, the combination of a lens, a cap inclosing a margin of the lens, projections upon the cap engaging the inclosed surfaces of the lens, and a layer of cement around the projections.

2. In eyeglasses or spectacles, the combination of a lens, a cap inclosing the margin of the lens and spaced therefrom, inwardly directed projections upon the cap engaging the inclosed surfaces of the lens, and a layer of cement filling the space between the cap and the lens surfaces and through which the projections pass.

3. In eyeglasses or spectacles, the combination of a lens, a cap inclosing a margin of the lens, pointed projections upon the interior of the cap with their points only in contact with the surfaces of the lens, and a layer of cement engaging the cap and lens surfaces adjacent the points.

4. In eyeglasses or spectacles, the combination of a lens, a cap inclosing a margin of the lens, conical projections upon the interior of the cap with their points only in contact with the surfaces of the lens, and a layer of cement engaging the cap and lens surfaces adjacent the points.

In testimony whereof I have affixed my signature in presence of two witnesses.

FREDERICK A. STEVENS.

Witnesses:
    EDW. H. ZIEGLER,
    HORATIO E. BELLOWS.